United States Patent
Baek (10) Patent No.: US 7,333,170 B2
(45) Date of Patent: Feb. 19, 2008

(54) IN PLANE SWITCHING MODE LIQUID CRYSTAL DISPLAY DEVICE INCLUDING 4 SUB-PIXELS HAVING DIFFERENT AREAS AND FABRICATION METHOD THEREOF

(75) Inventor: Heume-Il Baek, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 385 days.

(21) Appl. No.: 10/973,299

(22) Filed: Oct. 27, 2004

(65) Prior Publication Data
US 2005/0094077 A1    May 5, 2005

(30) Foreign Application Priority Data
Oct. 29, 2003    (KR) ...................... 10-2003-0076079

(51) Int. Cl.
*G02F 1/1343*    (2006.01)
(52) U.S. Cl. ...................... 349/141; 349/109; 349/145
(58) Field of Classification Search ................ 349/109, 349/141, 145, 146
See application file for complete search history.

(56) References Cited

U.S. PATENT DOCUMENTS

2002/0126246 A1    9/2002 Oh et al.

2005/0128413 A1 *    6/2005 Son et al. .................... 349/143

FOREIGN PATENT DOCUMENTS

JP    11-295717    10/1999

* cited by examiner

*Primary Examiner*—Andrew Schechter
(74) *Attorney, Agent, or Firm*—McKenna, Long & Aldridge LLP (57) ABSTRACT

An in plane switching mode liquid crystal display device and its fabrication method are disclosed. The in plane switching mode liquid crystal display device includes: a first and second substrate; a gate line and a data line respectively disposed horizontally and vertically on the first substrate; a first to a fourth sub-pixels defined by the gate line and the data line and arranged in a 2×2 matrix form; at least one pair of first and second electrodes disposed in each sub-pixel and generating an in-plane electric field; a first common line equally dividing the first and the second sub-pixels and connected to the first electrode disposed in the first and the second sub-pixels; a second common line dividing the third and the fourth sub-pixels to make an area of one of said sub-pixels larger than the other one and connected to the first electrode disposed in the third and the fourth sub-pixels; a switching device formed at a crossing of the gate line and the data line; and a liquid crystal layer formed between the first and the second substrates.

14 Claims, 9 Drawing Sheets

IN PLANE SWITCHING MODE LIQUID CRYSTAL DISPLAY DEVICE INCLUDING 4 SUB-PIXELS HAVING DIFFERENT AREAS AND FABRICATION METHOD THEREOF

This application claims the benefit of Korean Patent Application No. 76079/2003 filed on Oct. 29, 2003, which is hereby incorporated by reference for all purposes as if fully set forth herein.

BACKGROUND OF THE INVENTION

1. Field of the Invention

The present invention relates to a liquid crystal display device, and particularly to an in plane switching mode liquid crystal display device and its fabrication method capable of easily controlling areas of red, green, blue and white sub-pixels arranged in a 2×2 matrix form.

2. Description of the Related Art

A twisted nematic (TN) mode liquid crystal display (LCD) device, which is commonly used as a flat panel display device achieving high image quality and low power consumption, has a problem in that its viewing angle is narrow because of refractive anisotropy of its liquid crystal molecules. This is because liquid crystal molecules are aligned parallel to a substrate in the absence of a voltage and are aligned almost perpendicularly to the substrate when a voltage is applied.

To overcome this deficiency, present research includes active development of an in plane switching (IPS) mode LCD for solving the viewing angle problem by aligning liquid crystal molecules almost parallel to a substrate.

Figure 1A:
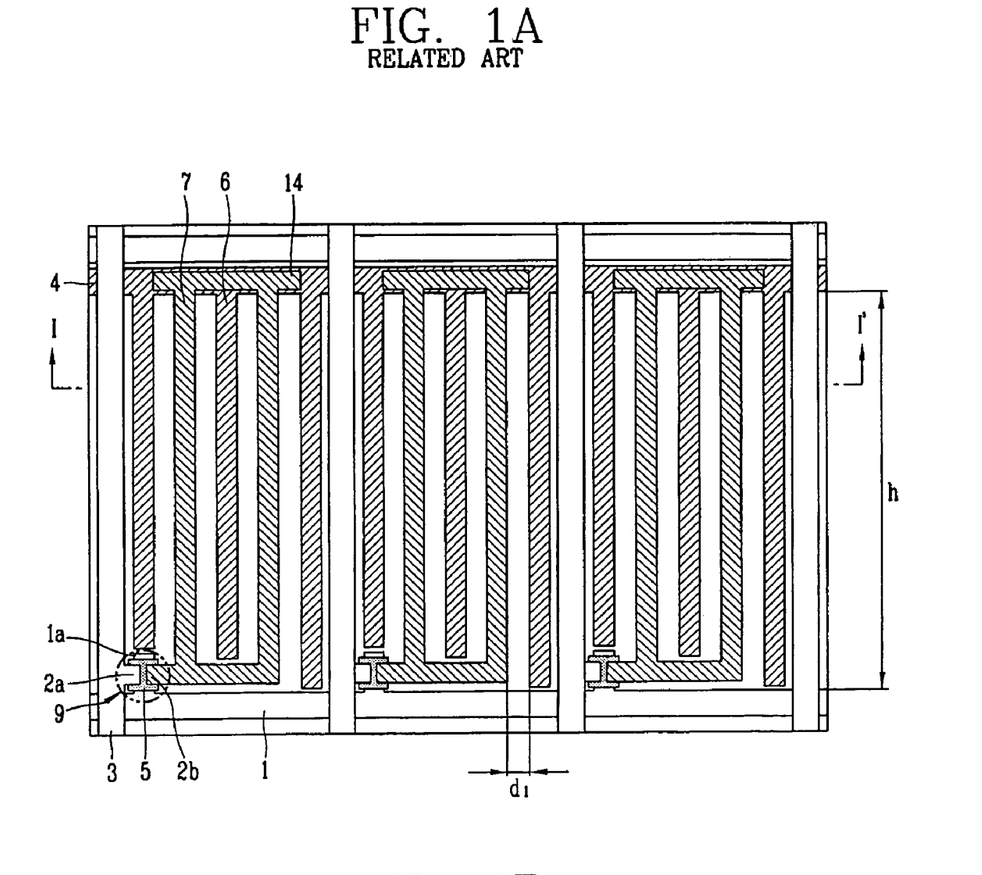
FIGS. 1A and 1B are views illustrating a structure of a related art IPS mode LCD device.
Figure 1B:
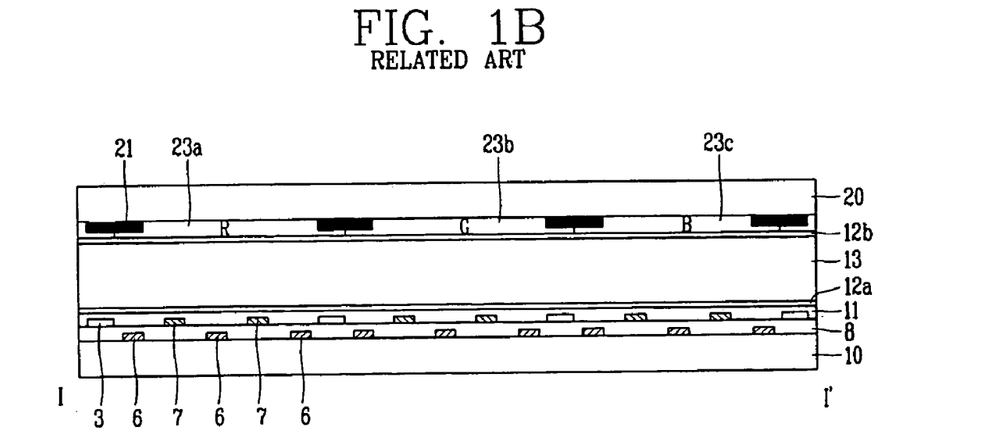

FIG. 1 is a schematic view of a unit pixel of a general IPS mode LCD device, wherein FIG. 1A is a plan view, and FIG. 1B is a cross sectional view taken along line I-I' of FIG. 1A.

As illustrated in FIGS. 1A and 1B, R, G and B sub-pixels construct one unit pixel, and each sub-pixel is defined by a gate line 1 and a data line 3 arranged horizontally and vertically on a transparent first substrate 10. As used hereinafter, the horizontal direction corresponds to the orientation of the gate line; and the vertical direction, which is perpendicular to the horizontal direction, corresponds to the orientation of the data line. Both the vertical and horizontal directions are parallel to the surface of the substrate. Although the n×m number of sub-pixels are defined by the 'n' number of gate lines 1 and the 'm' number of data lines 3 in an LCD device, only one set of Red, Green and Blue sub-pixels are illustrated here. As used hereinafter, the combined R, G and B sub-pixels are defined as a unit pixel.

A thin film transistor 9 of the related art is disposed at a crossing of the gate line 1 and the data line 3 defining the sub-pixel. The thin film transistor 9 includes a gate electrode 1a, a semiconductor layer 5 and source/drain electrodes 2a, 2b.

In the sub-pixel of the related art, a common line 4 is arranged parallel to the gate line 1, and at least one pair of electrodes, a common electrode 6 and a pixel electrode 7, are arranged parallel to the data line 3. The electrodes are for switching the liquid crystal molecules. Here, the common electrode 6 and the pixel electrode 7 are respectively connected to the common line 4 and the drain electrode 2b. A passivation film 11 and a first alignment layer 12a are further applied on the first substrate 10 having the source electrode 2a and the drain electrode 2b.

In addition, a pixel electrode line 14, which overlaps the common line 4 and is connected to the pixel electrode 7, forms a storage capacitor with the common line 4, wherein the pixel electrode line 14 and the common line 4 have a gate insulation film disposed between them.

A black matrix 21 for preventing leakage of light, and R, G and B color filters 23a-23c respectively corresponding to the sub-pixels, is formed on the second substrate 20. Additionally, a second alignment layer 12b, which along with the first alignment layer 12a determines an initial alignment state of the liquid crystal, is applied to the second substrate 20.

According to an IPS pixel structure of the related art, the liquid crystal layer 13, which is formed between the first substrate 10 and second substrate 20, transmits light according to a voltage applied between the common electrode 6 and the pixel electrode 7.

The related art IPS mode LCD device having such a structure is advantageous in that a viewing angle can be improved because a common electrode and a pixel electrode are disposed on the same plane and thus generate an in-plane electric field. However, the related art IPS mode LCD device has problems in that an aperture ratio is decreased, and its brightness is degraded because the common electrode 6 and the pixel electrode 7 are disposed in a pixel region where light would otherwise be transmitted to form an image.

SUMMARY OF THE INVENTION

Accordingly, the present invention is directed to an in plane switching mode liquid crystal display device and fabrication method thereof that substantially obviates one or more of the problems due to limitations and disadvantages of the related art.

An advantage of the present invention is to provide an IPS mode LCD device capable of improving brightness of a screen by constructing red (R), green (G), blue (B) and white (W) sub-pixels as one unit pixel.

Another advantage of the present invention is to provide an IPS mode LCD device capable of effectively improving an aperture ratio by disposing four sub-pixels of red, green, blue and white in a quad-type (2×2 arrangement).

Yet another advantage of the present invention is to provide an IPS mode LCD device capable of easily controlling an area of sub-pixels by disposing a common line between sub-pixels that are disposed vertically, wherein the two sub-pixels share the common line In order to achieve these and other advantages of the invention, an in plane switching mode liquid crystal display device comprises a first substrate and a second substrate; a plurality of gate lines disposed horizontally on the first substrate; a plurality of data lines disposed vertically on the first substrate, the plurality of gate lines and the plurality of data lines defining a first sub-pixel, a second sub-pixel, a third sub-pixel, and a fourth sub-pixel, wherein the sub-pixels are arranged in a 2×2 matrix form; at least one pair of first and second electrodes disposed in each sub-pixel; a first common line between the first and the second sub-pixels according to a first sub-pixel area ratio, the first common line connected to the first electrode disposed in the first and second sub-pixels; a second common line between the third and the fourth sub-pixels according to a second sub-pixel area ratio, the second sub-pixel area ratio being different from the first sub-pixel area ratio, and the second common line connected to the first electrode disposed in the third and fourth sub-pixels; a switching device formed at a crossing of the gate line and the data line; and a liquid crystal layer formed between the first and the second substrates.

In order to achieve these and other advantages of the invention, an in plane switching mode liquid crystal display device comprises a first substrate and a second substrate; a plurality of gate lines disposed horizontally on the first substrate; a plurality of data lines disposed vertically on the first substrate; a Red (R) sub-pixel, a Green (G) sub-pixel, a Blue (B) sub-pixel, and a White (W) sub-pixel defined by the gate lines and the data lines, wherein the sub-pixels are arranged in a 2×2 matrix form; at least one pair of a common electrode and a pixel electrode disposed in each sub-pixel; a first common line between the Red (R) and Green (G) sub-pixels according to a first area ratio, the first common line connected to the common electrode disposed in the Red (R) and Green (G) sub-pixels; a second common line between the Blue (B) and White (W) sub-pixels according to a second area ratio (B/W), the second area ratio being greater than 1, the second common line connected to the common electrode disposed in the Blue (B) and White (W) sub-pixels; a pixel electrode line overlapping the first and second common lines, forming a storage capacitor together with the first and second common lines, and electrically connecting the pixel electrode disposed in each sub-pixel; a switching device formed at a crossing of the gate line and the data line; and a liquid crystal layer formed between the first and the second substrates.

In order to achieve these and other advantages of the invention, a method of fabricating an in plane switching mode liquid crystal display device comprises providing a first substrate and a second substrate; forming a plurality of gate lines, a common electrode, and a common line on the first substrate, wherein the common line includes first and second common lines, the first common line disposed substantially at a center between the gate lines, the second common line disposed off-center between the gate lines, wherein the first and second common lines are electrically connected; forming a plurality of data lines disposed substantially perpendicularly to the gate lines and defining four sub-pixels together with the gate line and the first and the second common lines; a pixel electrode line overlapping the first and second common lines and forming a storage capacitor; and a pixel electrode substantially parallel to the common line and electrically connected to the pixel electrode line; and forming a liquid crystal layer between the first and second substrates.

In order to achieve these and other advantages of the invention, an in plane switching mode liquid crystal display device comprises a first substrate and a second substrate; a plurality of gate lines disposed horizontally on the first substrate; a plurality of data lines disposed vertically on the first substrate, the plurality of gate lines and the plurality of data lines defining a Red (R) sub-pixel, a Green (G) sub-pixel, a Blue (B) sub-pixel, and a White (W) sub-pixel, wherein the sub-pixels are arranged in a row; and at least one pair of first and second electrodes disposed in each sub-pixel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to exemplary embodiments of the present invention, examples of which are illustrated in the accompanying drawings.

Figure 2:
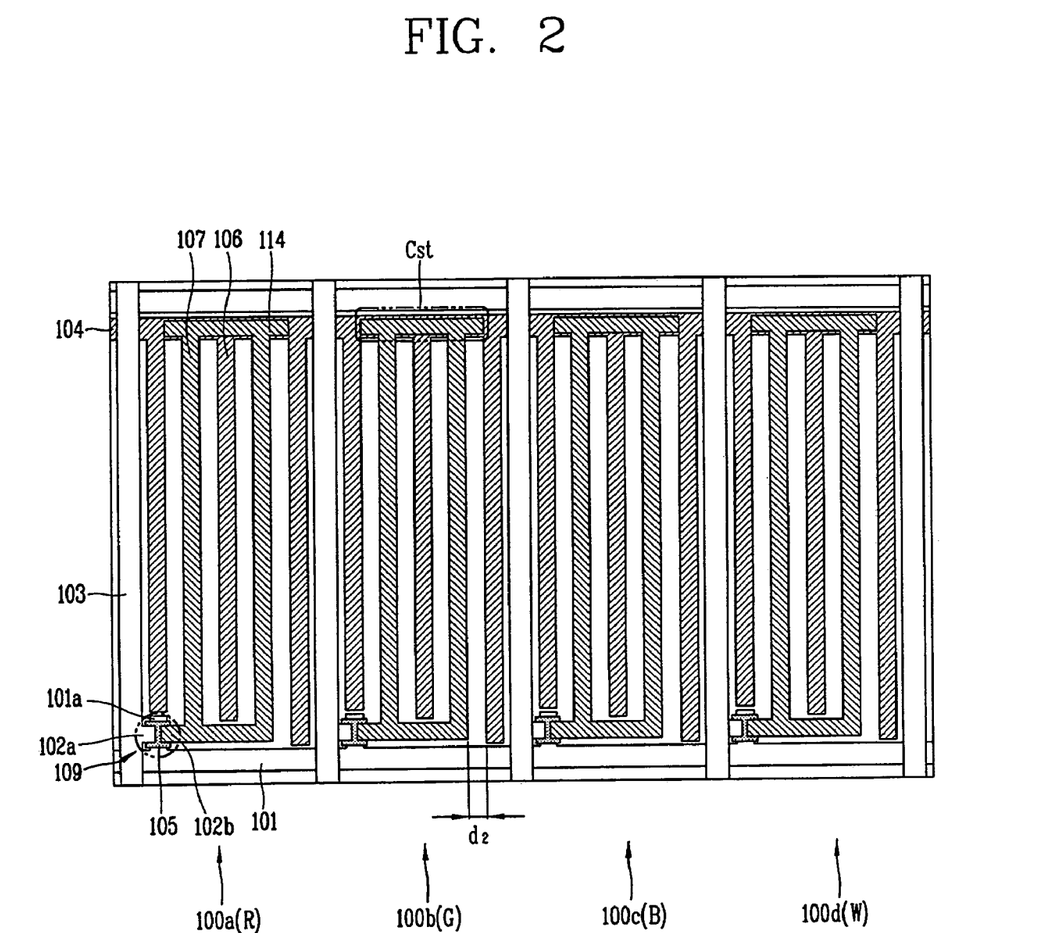
FIG. 2 is a view illustrating an IPS mode LCD device according to a first embodiment of the present invention.

FIG. 2 illustrates a first embodiment of the present invention: an in plane switching (IPS) mode liquid crystal display (LCD) device having a four transmissive regions within each sub-pixel. This embodiment of the IPS mode LCD device has a white(W) sub-pixel 100d in addition to the Red(R), Green(G) and Blue(B) sub-pixels (100a-100c). Here, the W sub-pixel 100d may be accommodated by reducing the width of each sub-pixel and maintaining the transmissive area of each sub-pixel.

The sub-pixels 100a, 100b, 100c and 100d are defined by a gate line 101 and a data line 103 arranged horizontally and vertically. In each sub-pixel 100a, 100b, 100c, 100d, a pixel electrode 107 substantially perpendicularly connects to a pixel electrode line 114, and a common electrode 106 perpendicularly connects to a common line 104. The pixel electrode 107 and the common electrode 106, which are alternately disposed, generate an in-plane electric field in the pixel when a voltage is applied between them. In addition, the common line 104 and the pixel electrode line 114 may overlap each other and form a storage capacitor (Cst) with a gate insulation film (not shown) between them.

Also, as a switching device, a thin film transistor 109 may be disposed at the crossing of the gate line 101 and data line 103. The thin film transistor 109 generally includes a semiconductor layer 105 formed on the gate electrode 101a; a source electrode 102a formed on the semiconductor layer 105; and a drain electrode 102b facing the source electrode 102a and electrically connected to the pixel electrode line 114. Also, although not shown in the drawing, a gate insulation film may be applied on an entire surface of the substrate on which the gate line 101 has been formed. The gate insulation film electrically insulates the common electrode 106 and the pixel electrode 107 from each other.

The following is a comparison between the first embodiment of the present invention and the related art. As illustrated in FIG. 1A, a separation distance between the pixel electrode 7 and the common electrode 6 is defined as d1. As illustrated in FIG. 2, the first embodiment of the present invention has a separation distance, d2, between the pixel electrode 107 and the common electrode 106. Because of such an addition of the W sub-pixel 100d in this embodiment, d2 is approximately equal to 0.5 d1. That is, if the W sub-pixel 100d is added, brightness can be improved to a certain extent, but the light transmission region (transmissive area of the pixel region not blocked by the pixel electrode or the common electrode) is decreased. This is because a unit pixel of this embodiment has four sub-pixels:

R, G, B and W, and substantially the same area as the unit pixel of the related art. The additional electrode structure of the W sub-pixel decreases the transmissive area of the unit pixel, which may reduce the increased brightness resulting from the addition of the W sub-pixel.

Figure 3:
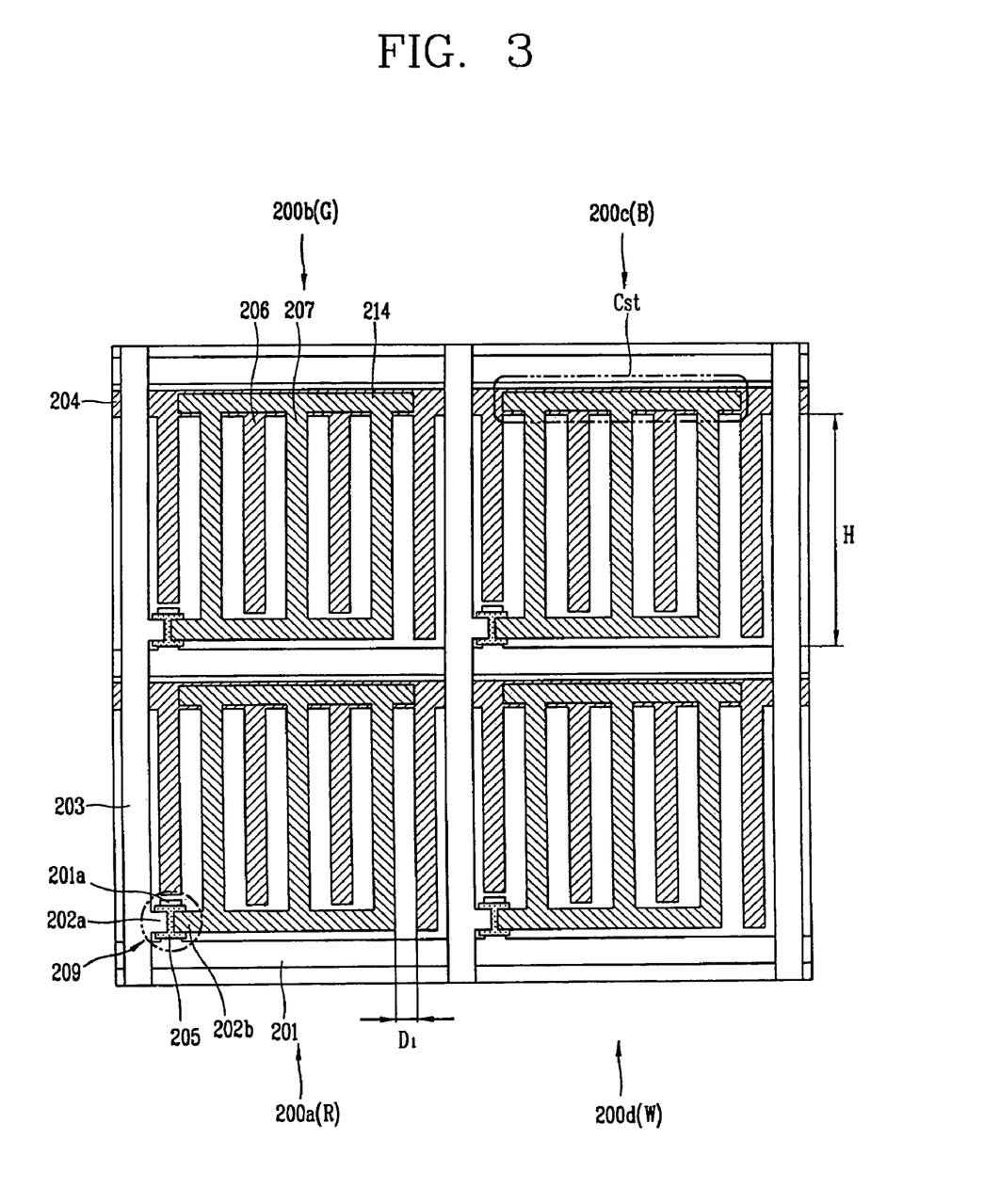
FIG. 3 illustrates an IPS mode LCD device according to a second embodiment of the present invention.

FIG. 3 illustrates a second embodiment of the present invention. In the second embodiment, sub-pixels R, G, B and W are arranged in a 2×2 matrix form, and each sub-pixel has six transmissive regions between electrodes 206 and 207, wherein each transmissive region that has a width, D1, that is substantially the same as the corresponding width of the related art structure. The sub-pixel arrangement, and the width of the transmission region, D1, improve brightness and aperture ratio relative to the related art.

As illustrated in FIG. 3, the IPS mode LCD device according to the second embodiment has R, G, B and W sub-pixels 200a-200d, each having six transmissive regions, wherein the sub-pixels are arranged in the 2×2 matrix to form a unit pixel (P). The sub-pixels 200a-200d are defined by gate lines 201 and data lines 203, respectively, and are arranged horizontally and vertically. In each sub-pixel 200a-200d is at least one pair of electrodes, a pair including a pixel electrode 207 connected to the pixel electrode line 214, and a common electrode 206 connected to the common line 204. The pixel electrodes 207 may be substantially perpendicularly oriented relative to the pixel electrode line 214, and the common electrode 206 may be substantially perpendicularly oriented relative to the common line 204. The pixel electrodes 207 and the common electrodes 206 may be alternately disposed and generate an in-plane electric field in the pixel on the application of a voltage. Further, the pixel electrode line 214 may overlap the common line 204 to form a storage capacitor (Cst).

A thin film transistor 209 is disposed as a switching device on the gate line 201. The thin film transistor 209 includes a semiconductor layer 205 formed on the gate line 201; a source electrode 202a formed on the semiconductor layer 205; and a drain electrode 202b facing the source electrode 202a and electrically connected to the pixel electrode line 214. In addition, although not shown in the drawing, a gate insulation film (not shown) may be deposited on an entire surface of a substrate on which the gate line 201 has been formed. The gate insulation film insulates the pixel electrode 207 and the common electrode 206 from each other.

In the IPS mode LCD device of this embodiment, a separation distance D1 between the pixel electrode 207 and the common electrode 206 may be the same as d1, the separation distance of the related four-block LCD device shown in FIG. 1A. With the sub-pixels 200a-200d arranged in a 2×2 matrix form according to this embodiment, a gate line and a common line are added between the sub-pixels that are disposed vertically, which may result in a in a vertical direction 'H' that is smaller than 'h', a vertical length shown in FIG. 1A, by about 15%. However, because two sub-pixels are disposed in a horizontal direction, the light transmission region may be increased by increasing D1 or by further adding a common electrode and a pixel electrode. By increasing D1, the width of the transmissive region of the sub-pixel may be increased in a proportion greater than the reduction of height 'H' such that the area of the transmissive region D1*H is increased, thereby improving brightness and aperture ratio.

Figure 4:
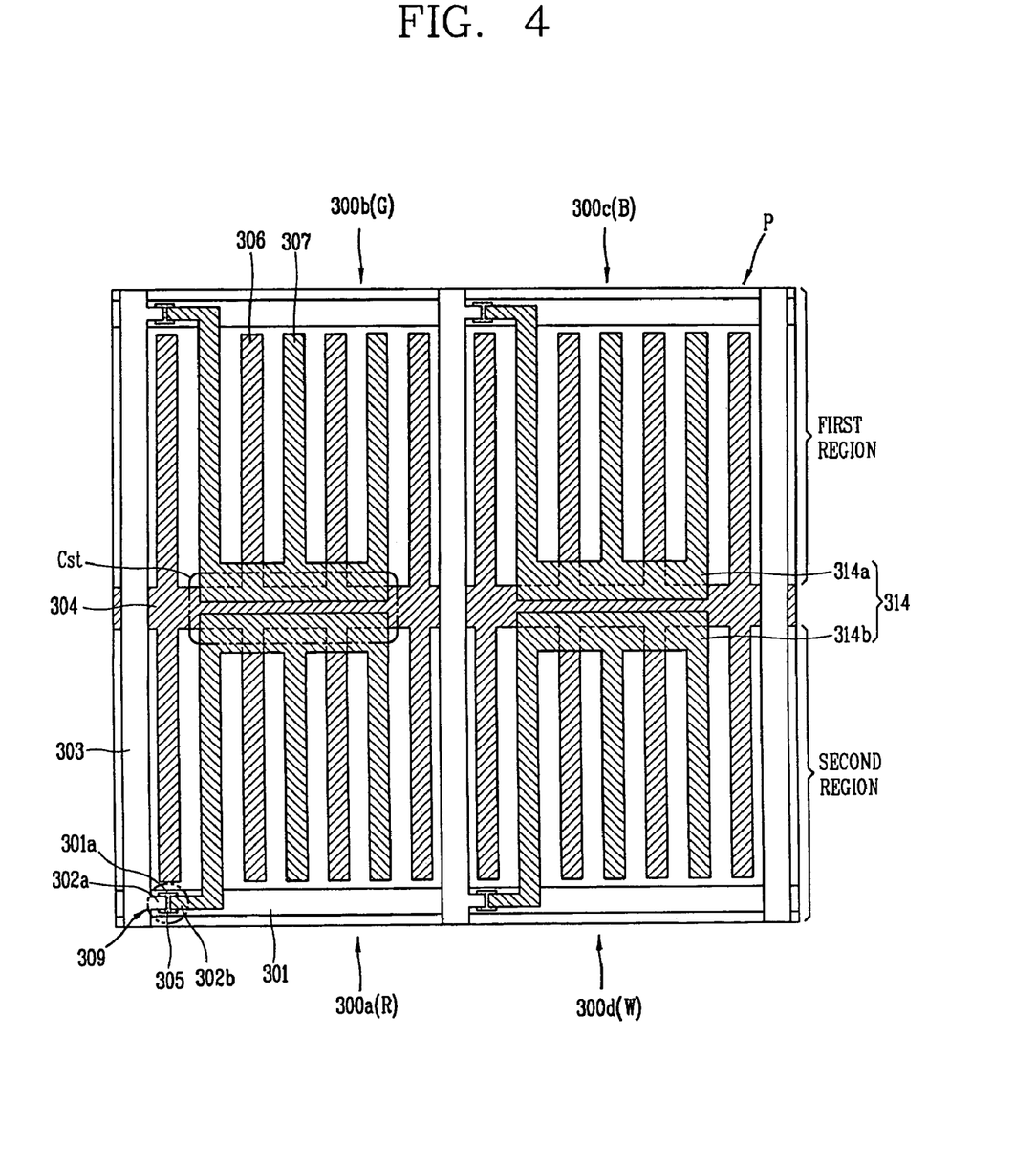
FIG. 4 illustrates an IPS mode LCD device according to a third embodiment of the present invention.

According to a third embodiment of the present invention, the aperture ratio may be improved by making sub-pixels, which are disposed vertically, share a common line. FIG. 4 illustrates the third embodiment of the present invention, in which an IPS mode LCD device has sub-pixels vertically arranged that share a common line.

The third embodiment is substantially similar to the second embodiment (FIG. 3), with a distinction in the disposition of a common line. This distinction is described below.

As illustrated in FIG. 4, in the IPS mode LCD device according to the third embodiment, a unit pixel is divided into sub-pixels by a common line 304 passing substantially through a center of the pixel (P) parallel to a gate line 301, and R, G, B and W sub-pixels 300a-300d are arranged in a 2×2 matrix form. The region above the common line 304 may be referred to as a first region, and the region below the common line 304 may be referred to as a second region. As illustrated in FIG. 4, the G and B sub-pixels 300b and 300c are disposed in the first region, and R and W sub-pixels 300a and 300d are disposed in the second region. It will be apparent that this exemplary embodiment may have the R, G, B, and W sub-pixels arranged in other configurations than that shown in FIG. 4.

The common line 304 is electrically connected to at least one common electrode 306 disposed in each sub-pixel, and forms a storage capacitor (Cst) together with a pixel electrode line 314 overlapping the common line 304. As illustrated in FIG. 4, the pixel electrode line 314 overlapping the common line 304 includes a first pixel electrode line 314a electrically connected to a pixel electrode 307 formed in the first region; and a second pixel electrode line 314b electrically connected to a pixel electrode 307 formed in the second region.

The IPS mode LCD device having such a structure can improve the aperture ratio because the sub-pixels disposed at upper and lower portions of the pixel share one common line. The common line is disposed at a boundary line between the first and second regions, and sub-pixels disposed vertically share the common line, thereby reducing a line-formed area.

As described above regarding the other embodiments, the addition of the W sub-pixel, and disposing the R, G, B and W sub-pixels in a 2×2 matrix form, improve brightness and aperture ratio. According to the third embodiment, the aperture ratio may be further improved by having two sub-pixels, which are disposed vertically, share the common line.

In general, the brightness of the W sub-pixel is higher than the sum of brightness of the R, G and B sub-pixels. However, when a driving algorithm is theoretically calculated, the sum of brightness of the R, G and B sub-pixels is considered to be substantially the same as the brightness of the W sub-pixel. Therefore, a pixel may be designed such that the sum of the brightness of the actual R, G and B sub-pixels becomes substantially the same as the brightness of the W-sub-pixel.

Figure 5A:
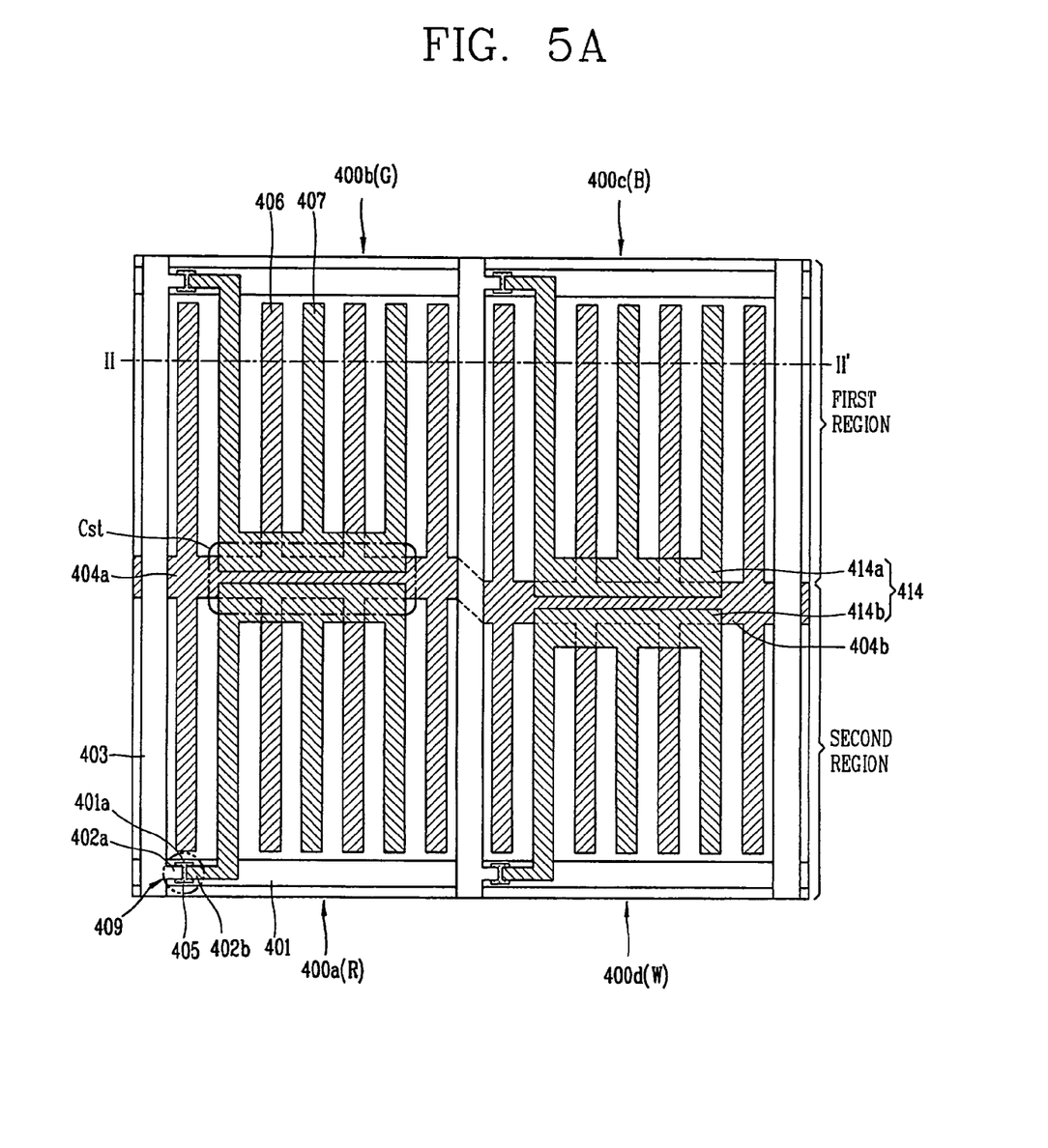
FIGS. 5A and 5B are of an IPS mode LCD device according to a fourth embodiment of the present invention.
Figure 5B:
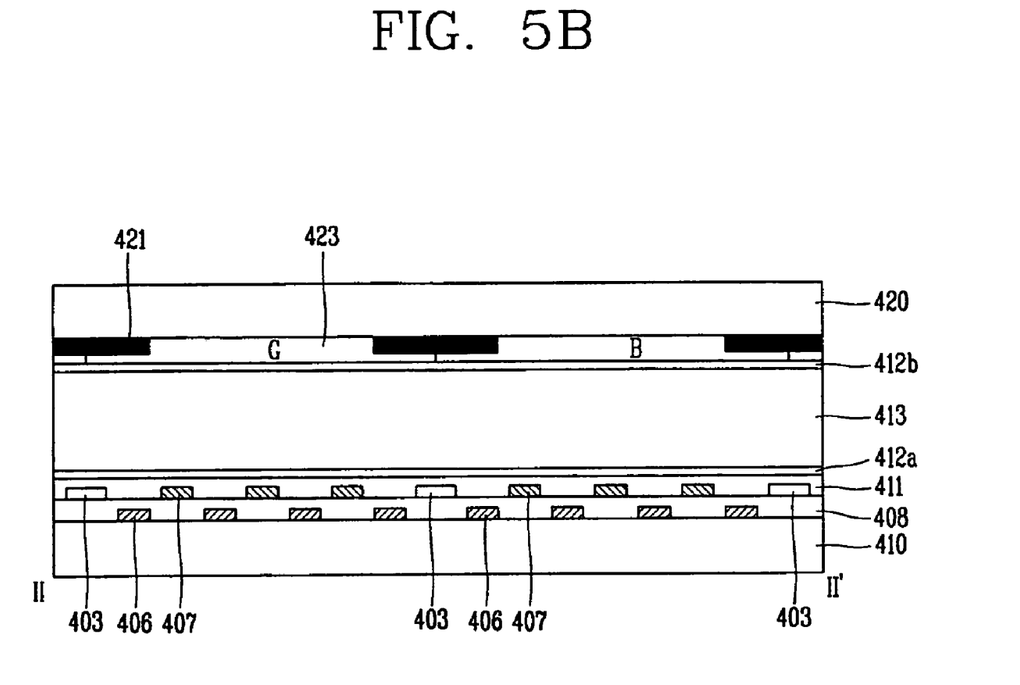

Accordingly, the fourth embodiment of the present invention provides an IPS mode LCD device in which sub-pixels may each have a different area. An IPS mode LCD device of this embodiment may have sub-pixels arranged in a 2×2 matrix form.

The fourth embodiment of the present invention is illustrated in FIGS. 5A and 5B, illustrating an IPS mode LCD device in which sub-pixels are constructed to be different in area. FIG. 5A is a plan view, and FIG. 5B is a cross-sectional view taken along line II-II' of FIG. 5A. The present embodiment may have substantially similar components as the third embodiment (FIG. 4), but with first and second common lines dividing sub-pixels into a first region and a second region.

The first region contains G and B sub-pixels 400b and 400c, and the second region contains R and W sub-pixels 400a and 400d. The G sub-pixel 400b of the first region and the R sub-pixel 400a of the second region are divided by a first common line 404a. Given the placement of the common line 404a, the R sub-pixel 400a and the G sub-pixel 400b may have substantially the same area, and thereby may have a sub-pixel area ratio (R/G) approximately equal to one. The B sub-pixel 400c of the first region and the W sub-pixel 400d of the second region are divided by a second common line 404b disposed between the two sub-pixel areas, and these two pixels are different in area. That is, the area of the B sub-pixel 400c is larger than the W sub-pixel 400d, thereby having a sub-pixel area ratio (B/W) greater than 1. Such a difference in area can be obtained since the second common line 404b is disposed further toward the second region. In other words, the second common line 404b is shifted to a lower position than the first common line 404a. Here, the first common line 404a and the second common line 404b should be electrically connected.

The B sub-pixel 400c and the W sub-pixel 400d are made to be different in area so that the sum of the brightnesses of the R, G and B sub-pixels 400a-400c becomes substantially the same as the brightness of the W sub-pixel 400d. To achieve this, the area of the W sub-pixel 400d is reduced.

Also, as the area of the W sub-pixel 400d decreases, the area of the B sub-pixel 400c increases proportionately. Such an increase little affects the sum of brightness of the R, G and B sub-pixels (400a-400c). Namely, extent of contribution of the R, G and B sub-pixels 400a-400C in relation to overall brightness are approximately 35%, 55% and 10%, respectively. As such, the contribution of the B sub-pixel in relation to the overall brightness is very small. Accordingly, despite the increased area of the B sub-pixel 400c, the sum of the brightnesses of the R, G and B sub-pixels is little changed, and the brightness of the W-sub-pixel 400d is decreased. Hence, the difference between the sum of the brightnesses of the R, G and B sub-pixels 400a-400c and the brightness of the W sub-pixel may be minimized.

According to the fourth embodiment of the present invention, the B sub-pixel and the W sub-pixel are divided by common line 404b so as to be disposed vertically because the B sub-pixels has the smallest contribution rate in relation to the overall brightness. This is because a vertical displacement of the second common line determines the areas of the B and W sub-pixels. However, any type of disposition of the R, G and B sub-pixels may be used provided that the area of the W sub-pixel 400d is formed to be smaller than the areas of other sub-pixels. Other sub-pixel configurations may be possible in order to increase the area of the B sub-pixel 400a and decrease the area of the W sub-pixel 400d, and are within the scope of the present invention.

The pixel structure, as illustrated in FIG. 5B, may be formed as follows. A common electrode 406 may be formed on a transparent first substrate 410, and a gate insulation film 408 may be deposited thereon. A pixel electrode 407, which generates an in-plane electric field together with the common electrode 406, may be formed on the gate insulation film 408. A passivation film 411 and first alignment layer 412a may be deposited thereon.

Also, a black matrix 421 for preventing leakage of light and R, G, B and W color filters 423 may be formed on a transparent second substrate 420, and a second alignment layer 421b may be applied thereon. In addition, a liquid crystal layer 413, which is driven by the lateral electric field generated between the pixel electrode 407 and the common electrode 406, may be formed between the first and second substrates 410 and 420.

In the fourth embodiment of the present invention, the sub-pixels may be constructed to be different in area by making sub-pixels, which are disposed vertically, share a common line, wherein the common line is shifted at a prescribed interval. Especially, by displacing the common line shared by the B sub-pixel and the W sub-pixel, the brightness of the W sub-pixel may be made approximately the same as the total brightness of the R, G and B sub-pixels, so that the color of the unit pixel can be implemented almost the same as a result of a theoretical calculation.

Figure 7:
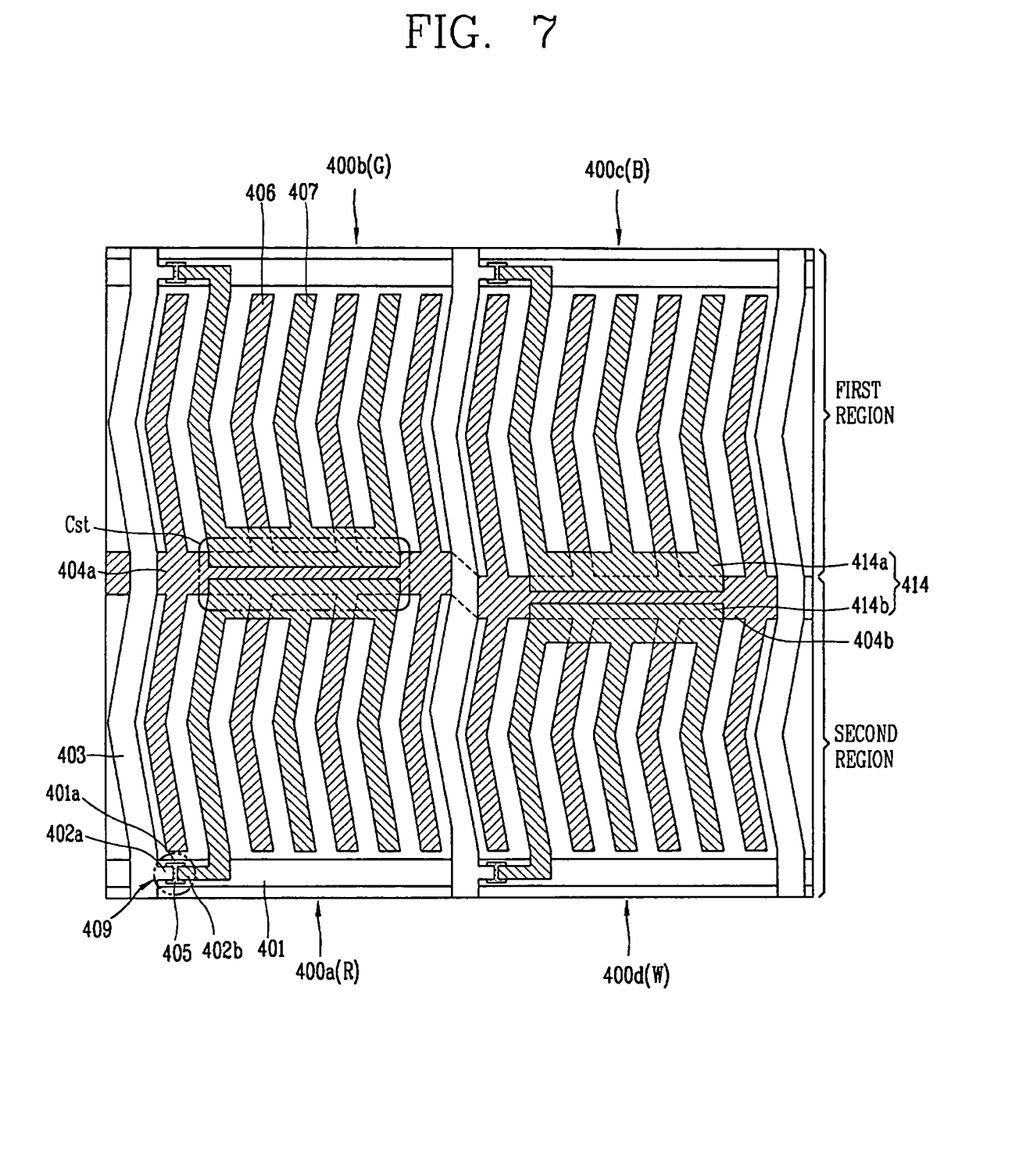
FIG. 7 illustrates an IPS mode LCD device according to the present invention that includes electrodes having a zigzag structure.

The present invention does not limit the positions of the common electrode and pixel electrode, and the common electrode and the pixel electrode may be formed on the same plane, such as on a passivation film. When the common electrode and the pixel electrode are formed on the same plane as above, the electric field between the two electrodes becomes stronger, and liquid crystal molecules in a liquid crystal layer may be switched at a faster speed by the stronger electric field. In addition, the two electrodes may be made of a transparent conductive material such as ITO or IZO, thereby improving an aperture ratio. Also, as illustrated in FIG. 7, the common electrode and the pixel electrode may have zigzag-shaped structures in order to form a multi domain and thus further improve color characteristics.

An exemplary fabrication process of an IPS mode LCD device described in the fourth embodiment (FIGS. 5A and 5B) will now be briefly described.

Figure 6A:
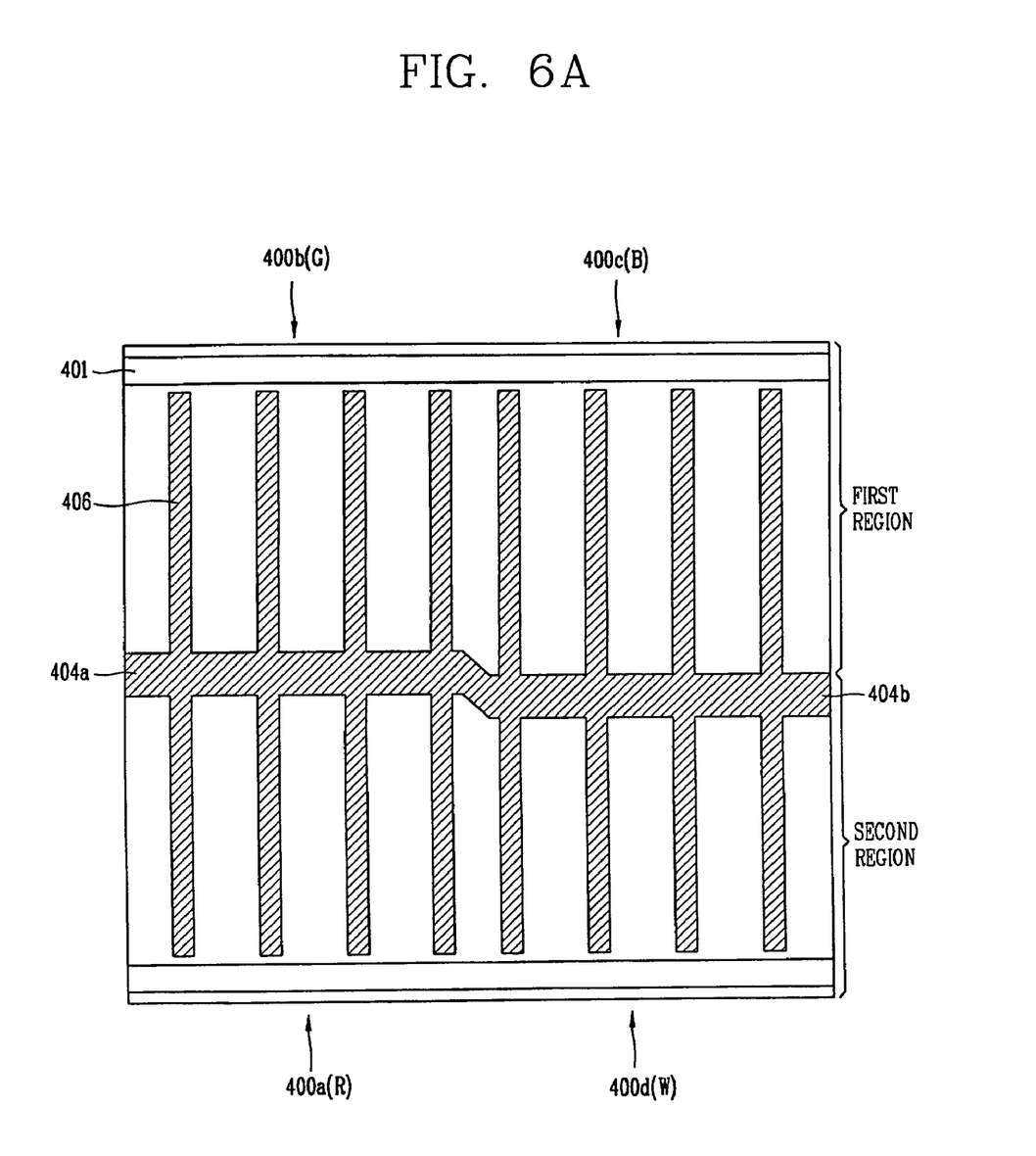
FIGS. 6A and 6B are of a fabrication method of an IPS mode LCD device according to the present invention.

FIGS. 6A and 6B are plan views for a fabrication method of the LCD device described in the fourth embodiment. First, as illustrated in FIG. 6A, a transparent insulation substrate 410 such as glass is prepared. Metal such as Cu, Ti, Cr, Al, Mo, Ta, or Al alloy is deposited on the substrate 410 through a sputtering method, and patterning is performed thereon, forming a gate line 401, a common electrode 406 and first and second common lines 404a, 404b. Here, the first common line 404a is formed to pass substantially through the center between the gate lines 401, and the second common line 404b is formed at an upper or lower position relative to the first common line 404a. The two common lines 404a and 404b are electrically connected to each other.

Thereafter, SiNx, SiOx or the like is deposited on an entire surface of the substrate 410 including the gate line 401 and the common line 404 by a plasma CVD method, thereby forming a gate insulation film (not shown).

Figure 6B:
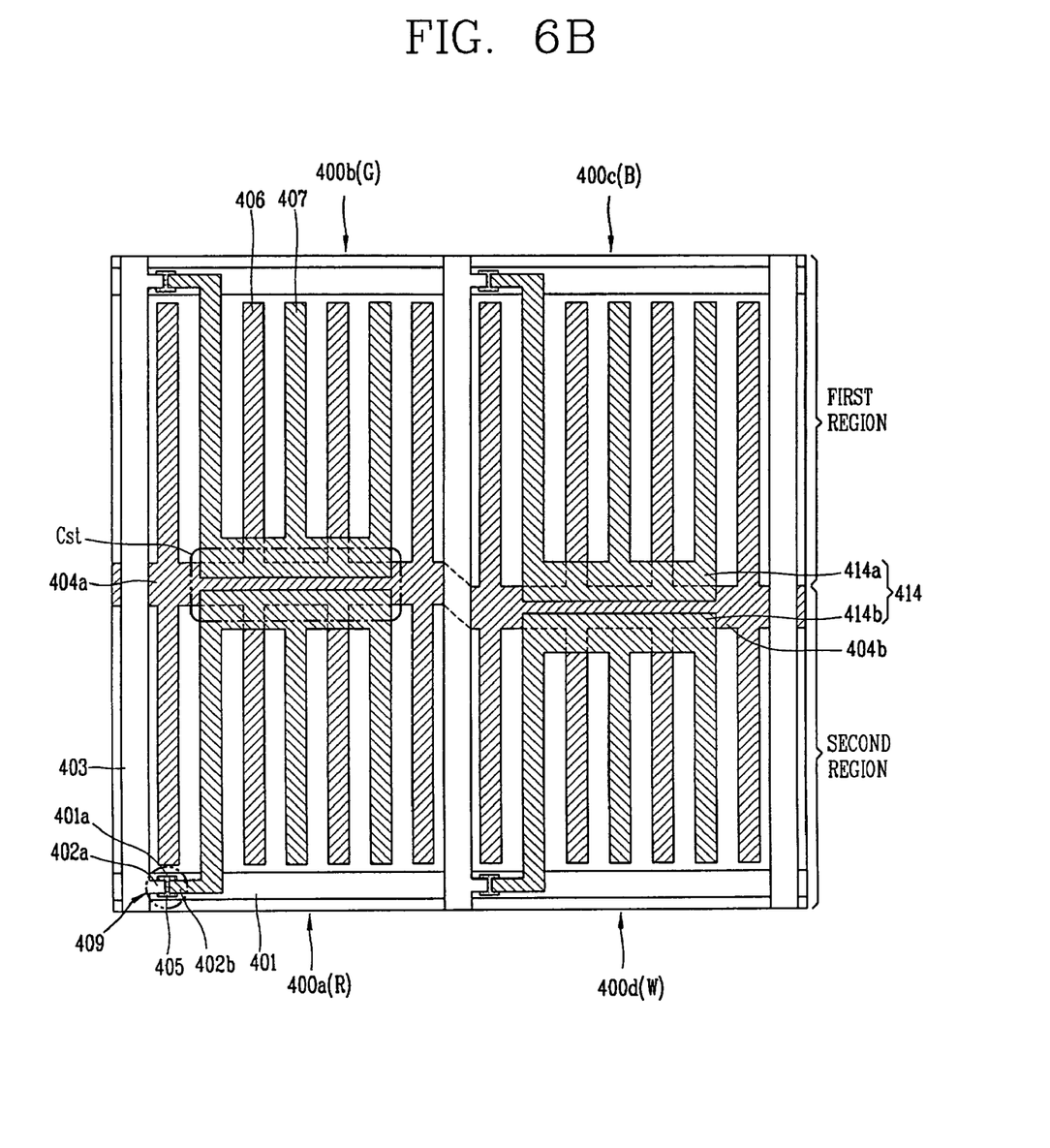

After the gate insulation film is formed, amorphous silicon and n⁺ amorphous silicon are stacked on the gate insulation film (not shown), and patterning is performed, thereby forming a semiconductor layer 405 on the gate line 401, as illustrated in FIG. 6B. Then, metal such as Cu, Mo, Ta, Al, Cr, Ti, or Al alloy is deposited on the semiconductor layer 405 and the gate insulation film (not shown) through a sputtering method. The metal is patterned to form a data line 403 disposed substantially perpendicularly to the gate line 401, which defines four sub-pixels together with the gate line 401 and the first and second common lines 404a and 404b. The patterning of the metal also forms the source/drain electrodes 302a/302b formed on the semiconductor layer 405 at a predetermined interval; a pixel electrode line 414 overlapping the first and second common lines 404a and 404b and forming a storage capacitor (Cst); and a pixel electrode 407 electrically connected to the pixel electrode line 414 and parallel to the common line 406.

Then, an inorganic material such as SiNx or SiOx or an organic material such as benzocyclobutene or acryl is applied on the substrate on which a thin film transistor 409 has been formed, thereby forming a passivation film (not shown). Next, the first substrate fabricated according to the exemplary process is attached to a second substrate that includes a color filter, thereby completing a panel of an LCD device.

The common electrode and the pixel electrode may be formed on the passivation film, and the two electrodes may be made of a transparent conductive material such as ITO or IZO.

As described above, the present invention provides an IPS mode LCD device having a high aperture ratio and high brightness, in which sub-pixels may be constructed to be different in area. Particularly, the sum of brightness of R, G and B sub-pixels becomes substantially the same as the brightness of a W sub-pixels by making sub-pixels, which are disposed vertically, share a common line, decreasing an area of the W sub-pixel and increasing an area of the B sub-pixel. As so far described, in an LCD device according to the present invention, brightness is improved by disposing R, G, B and W sub-pixels in a 2×2 matrix form. In addition, in the present invention, an aperture ratio is further improved by making sub-pixels, which are disposed vertically, share one common line. Also, in the present invention, sub-pixels may be constructed to be different in area by vertically shifting a common line shared by the sub-pixels which are disposed up and down, so that the sum of brightness of the R, G and B sub-pixels becomes the same as the brightness of the W sub-pixel.

It will be apparent to those skilled in the art that various modifications and variation can be made in the present invention without departing from the spirit or scope of the invention. Thus it is intended that the present invention cover the modifications and variations of this invention provided they come within the scope of the appended claims and their equivalents.

What is claimed is:

1. An in plane switching mode liquid crystal display device, comprising:
   a first substrate and a second substrate;
   a plurality of gate lines disposed horizontally on the first substrate;
   a plurality of data lines disposed vertically on the first substrate, the plurality of gate lines and the plurality of data lines defining a first sub-pixel, a second sub-pixel, a third sub-pixel, and a fourth sub-pixel, wherein the sub-pixels are arranged in a 2×2 matrix form;
   at least one pair of first and second electrodes disposed in each sub-pixel;
   a first common line between the first and the second sub-pixels according to a first sub-pixel area ratio, the first common line connected to the first electrode disposed in the first and second sub-pixels;
   a second common line between the third and the fourth sub-pixels according to a second sub-pixel area ratio, the second sub-pixel area ratio being different from the first sub-pixel area ratio, and the second common line connected to the first electrode disposed in the third and fourth sub-pixels;
   a switching device formed at a crossing of the gate line and the data line; and
   a liquid crystal layer formed between the first and the second substrates.

2. The device of claim 1, wherein the first to fourth sub-pixels are Red (R), Green (G), Blue (B) and White (W) sub-pixels, respectively.

3. The device of claim 2, wherein the first sub-pixel area ratio and the second sub-pixel area ratio substantially conform to a relation whereby a sum of the brightnesses of the R, G, and B sub-pixels substantially equals a brightness of the W sub-pixel.

4. The device of claim 1, wherein the first electrode is a common electrode, and the second electrode is a pixel electrode.

5. The device of claim 1, wherein the first common line and the second common line are electrically connected.

6. The device of claim 1, wherein the switching device comprises:
   a gate electrode;
   a gate insulation film formed on an entire surface of a substrate including the gate electrode;
   a semiconductor layer formed on the gate insulation film; and
   a source and a drain electrodes on the semiconductor layer.

7. The device of claim 1,
   further comprising pixel electrode lines disposed in the first area between the first sub-pixel and the second sub-pixel and in the second area between the third sub-pixel and the fourth sub-pixel overlapping the first or second common lines and to be connected to the second electrode disposed in each respective sub-pixel, the pixel electrode being overlapped with the first common line or the second common line in the first area and the second area.

8. The device of claim 1, wherein the first common line is shared by the first and the second sub-pixels.

9. The device of claim 1, wherein the second common line is shared by the third and the fourth sub-pixels.

10. The device of claim 1, wherein the first and second electrodes have zigzag structures.

11. An in plane switching mode liquid crystal display device, comprising:
    a first substrate and a second substrate;
    a plurality of gate lines disposed horizontally on the first substrate;
    a plurality of data lines disposed vertically on the first substrate;
    a Red (R) sub-pixel, a Green (G) sub-pixel, a Blue (B) sub-pixel, and a White (W) sub-pixel defined by the gate lines and the data lines, wherein the sub-pixels are arranged in a 2×2 matrix form;
    at least one pair of a common electrode and a pixel electrode disposed in each sub-pixel;
    a first common line between the Red (R) and Green (G) sub-pixels according to a first area ratio (R/G), the first common line connected to the common electrode disposed in the Red (R) and Green (G) sub-pixels;
    a second common line between the Blue (B) and White (W) sub-pixels according to a second area ratio (B/W), the second area ratio being greater than 1, the second common line connected to the common electrode disposed in the Blue (B) and White (W) sub-pixels;
    pixel electrode lines in the first area between the first sub-pixel and the second sub-pixel and in the second area between the third sub-pixel and the fourth sub-pixel, one of the pixel electrode lines being overlapped with the first or second common lines in the first area and the second area, to form a storage capacitor together with the first or second common lines, and electrically connecting to the pixel electrode disposed in the respective sub-pixel;

a switching device formed at a crossing of the gate line and the data line; and a liquid crystal layer formed between the first and second substrates.

12. The device of claim 11, wherein the first area ratio and the second area ratio substantially satisfy a relation whereby a sum of the brightnesses of the R, G, and B pixels substantially equal a brightness of the W pixel.

13. A method of fabricating an in plane switching mode liquid crystal display device, comprising:

providing a first substrate and a second substrate;

forming a plurality of gate lines, a common electrode, and a common line on the first substrate, wherein the common line includes first and second common lines, the first common line disposed substantially at a center between the gate lines, the second common line disposed off-center between the gate lines, wherein the first and second common lines are electrically connected;

forming a plurality of data lines disposed substantially perpendicularly to the gate lines and defining four sub-pixels together with the gate line and the first and the second common lines; pixel electrode lines disposed in the first area between the first sub-pixel and the second sub-pixel and in the second area between the third sub-pixel and the fourth sub-pixel to be overlapped with the first or second common lines in the first area and the second area and to form a storage capacitor; and a pixel electrode substantially parallel to the common electrode and electrically connected to one of the pixel electrode lines; and forming a liquid crystal layer between the first and second substrates.

14. The method of claim of claim 13, further comprising preparing the second substrate including:

forming a black matrix on the second substrate; and forming a color filter on the second substrate.

* * * * *